(12) United States Patent
Suen et al.

(10) Patent No.: US 10,393,527 B2
(45) Date of Patent: Aug. 27, 2019

(54) UAV NAVIGATION OBSTACLE AVOIDANCE SYSTEM AND METHOD THEREOF

(71) Applicant: National Chung Shan Institute of Science and Technology, Taoyuan (TW)

(72) Inventors: Tain-Wen Suen, Taoyuan (TW); Feng-Ling Liu, Taoyuan (TW); Yu Han, Taoyuan (TW)

(73) Assignee: NATIONAL CHUNG SHAN INSTITUTE OF SCIENCE AND TECHNOLOGY (TW)

( * ) Notice: Subject to any disclaimer, the term of this patent is extended or adjusted under 35 U.S.C. 154(b) by 27 days.

(21) Appl. No.: 15/848,313

(22) Filed: Dec. 20, 2017

(65) Prior Publication Data

US 2019/0186918 A1    Jun. 20, 2019

(51) Int. Cl.
| | |
|---|---|
| *G01C 21/00* | (2006.01) |
| *G01S 19/47* | (2010.01) |
| *G01S 13/86* | (2006.01) |
| *B64D 47/08* | (2006.01) |
| *B64C 39/02* | (2006.01) |
| *G01S 13/93* | (2006.01) |

(52) U.S. Cl.
CPC ............ *G01C 21/00* (2013.01); *B64C 39/024* (2013.01); *B64D 47/08* (2013.01); *G01S 13/867* (2013.01); *G01S 19/47* (2013.01); *B64C 2201/145* (2013.01); *B64C 2201/146* (2013.01); *G01S 13/9303* (2013.01)

(58) Field of Classification Search
CPC . G01C 21/00; B64C 39/024; B64C 2201/145; B64C 2201/146; B64D 47/08; G01S 19/47; G01S 13/9303
USPC ............................................... 701/3
See application file for complete search history.

(56) References Cited

U.S. PATENT DOCUMENTS

2017/0069214 A1*   3/2017   Dupray ............... G08G 5/0021

FOREIGN PATENT DOCUMENTS

TW    M518111 U    3/2016

* cited by examiner

*Primary Examiner* — Gertrude Arthur Jeanglaude
(74) *Attorney, Agent, or Firm* — Schmeiser, Olsen & Watts, LLP

(57) ABSTRACT

An unmanned aerial vehicle (UAV) navigation obstacle avoidance system and method thereof are introduced. The UAV navigation obstacle avoidance system provides with functions of automatically controlling the UAV motive power sources to control the flight of UAV and avoid the obstacle. The system comprises a sensing device, a signal processing module, a communication module, a control module. The sensing device detects the relative direction, velocity and distance between a UAV and a dynamic or static obstacle. The sensing device also detects the real-time position, flight attitude and inertia signals of the UAV. The signal processing module generates a UAV flight control signal. The control module receives the UAV flight control signal and controls each of the UAV motive power sources. Therefore, the system achieves the purpose of controlling flight and obstacle avoidance and forward to the original planned follow-on flight route after the avoidance.

10 Claims, 3 Drawing Sheets

UAV NAVIGATION OBSTACLE AVOIDANCE SYSTEM AND METHOD THEREOF

FIELD OF THE INVENTION

The present disclosure relates to a navigation obstacle avoidance system and, more particularly, to an unmanned aerial vehicle (UAV) navigation obstacle avoidance system and method thereof used for a UAV.

BACKGROUND OF THE INVENTION

Due to advances in science and technology, UAV design has been more sophisticated. With the optical, ultrasonic and microwave sensors mounted on a UAV, the UAV can be used in entertainment, exploration, disaster relief, delivery, and even crime and war.

Due to the increasing effective distance of wireless remote control, the flight distance and altitude of the UAV increase. Therefore, it is a new discussion topic whether the UAV can fly safely beyond the visual range. In FIG. 1, which is a schematic diagram of Taiwan patent No. TWM518111, the system is a UAV active obstacle avoidance system which includes a transmitter 10, a microprocessor control board 11, a distance sensor 12, a signal receiver 13 and a UAV 14. The main body of the UAV automatic obstacle avoidance system is the microprocessor control board 11, wherein the microprocessor control board 11 is connected to each of the distance sensors 12. By using the measure results of distance sensor 12 and according to the obstacle avoidance conditions defined in a program, values of the controls signal of the UAV 14 are modified when necessary, so as to achieve the purpose of avoiding obstacles.

The obstacle avoidance system uses ultrasonic, optical sensors with infrared rays, laser or the like or radar to detect the relative distance. However, the obstacle avoidance system does not describe many functions of the radar. If the obstacle is not big enough or the weather is not good enough, then the obstacle avoidance performance of the obstacle avoidance system may be weakened. Further, the obstacle avoidance system is not mentioned to equip with position and inertial sensors, and thus the obstacle avoidance system has no automatic navigation function.

SUMMARY OF THE INVENTION

In view of the above disadvantages of the prior art, one object of the present disclosure is to provide a UAV navigation obstacle avoidance system and a method thereof for detecting the relative direction, the velocity and the distance between a UAV and an obstacle through a sensing device, generating a UAV flight control signal via the signal processing module and receiving the flight control signal through the control module. The control module controls each of the motive power sources of the UAV so as to achieve the purpose of controlling the flight of the UAV and obstruction avoidance.

Another object of the present disclosure is to provide a UAV navigation system and method thereof for detecting real-time position and flight attitude and inertia signals of a UAV through a sensing device and setting flight mission planning routes so as to achieve the purpose of navigation route revision.

To achieve the above objective, the present disclosure provides a UAV navigation obstacle avoidance system and a method thereof. The system includes a communication module, a sensing device, a signal processing module, and a control module. The communication module provides the UAV's present position, safety value setting and flight mission planning route to the signal processing module before the UAV taking off. The sensing device detects the relative direction, the velocity, the distance between a UAV and a dynamic or static obstacle, and the real-time position, flight attitude and inertia signal of the UAV. The signal processing module generates a UAV flight control signal. The control module receives the UAV flight control signal generated by the signal processing module and controls the motive power source of the UAV. Therefore, the system achieves the purpose of UAV flight control, obstacle avoidance and forward to the original planned flight route after avoiding obstacles.

DETAILED DESCRIPTION OF THE PREFERRED EMBODIMENTS

Figure 1:
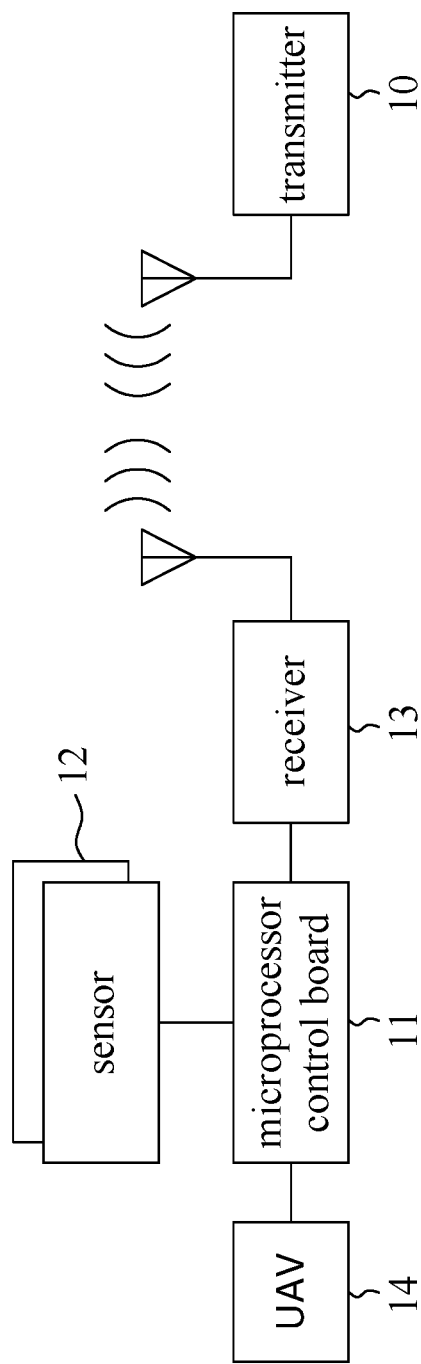
FIG. 1 shows a schematic diagram of Taiwan patent No. TWM518111.
Figure 2:
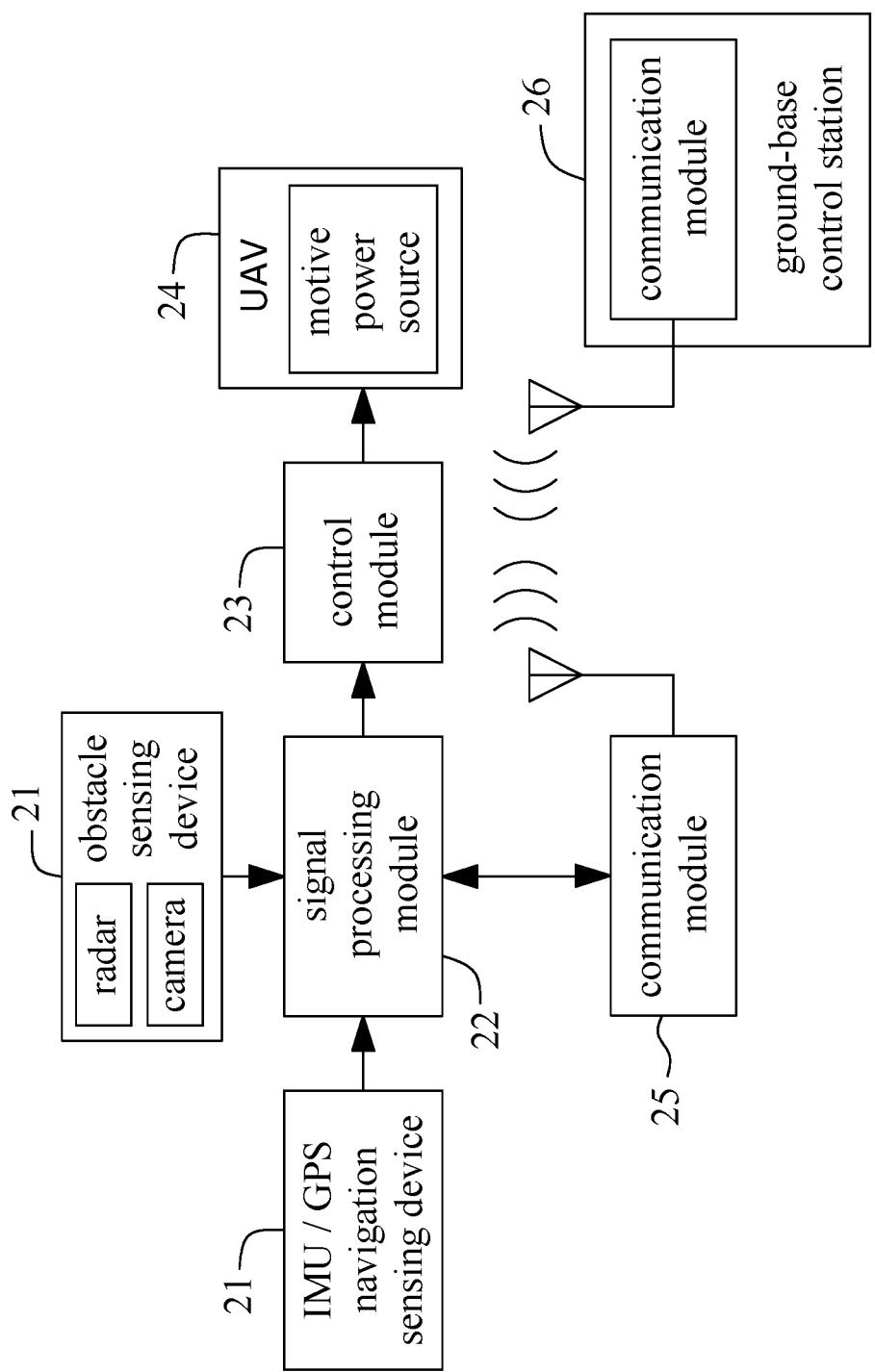
FIG. 2 shows a diagram of a UAV navigation obstacle avoidance system according to an embodiment of the present disclosure.

Please refer to FIG. 2, which is a diagram of an unmanned aerial vehicle (UAV) navigation/obstacle avoidance system according to an embodiment of the present disclosure. The UAV navigation/obstacle avoidance system is equipped with automatic control UAV motive power sources for UAV flight direction, attitude and velocity control and obstacle avoidance. As shown as FIG. 2, the system includes a sensing device 21, a signal processing module 22, a control module 23, a UAV 24, a communication module 25 and a ground-base control station 26. The above three modules and a device are assembled on the UAV 24. The sensing device 21 includes a navigation sensing device combined with a Global Positioning System (GPS)/Global Navigation Satellite System (GNSS) and an inertial measurement unit (IMU), a camera and other obstacle sensing devices including radar. The signal processing module 22 periodically receives the sensed values of the sensing device 21 and processes with the mission planning route to generate the flight control signals to the control module 23. The signal processing module is a microprocessor. The control module 23 controls each motive power source of the UAV 24 and the flight heading, the attitude and the speed of the UAV 24. The communication module 25 is a transmitting/receiving bidirectional device serving as a function of transmitting and receiving information between the UAV and the ground-base control station 26.

The obstacle sensing device 21 can detect the relative direction, the velocity and the distance between the UAV 24 and dynamic or static obstacles near the UAV 24 and provide the relative direction, the velocity and the distance between the UAV 24 and dynamic or static obstacles near the UAV 24 to the signal processing module 22. The navigation sensing device can provide the flight heading, attitude, acceleration and real-time position of the UAV 24 to the signal processing module 22.

Figure 3:
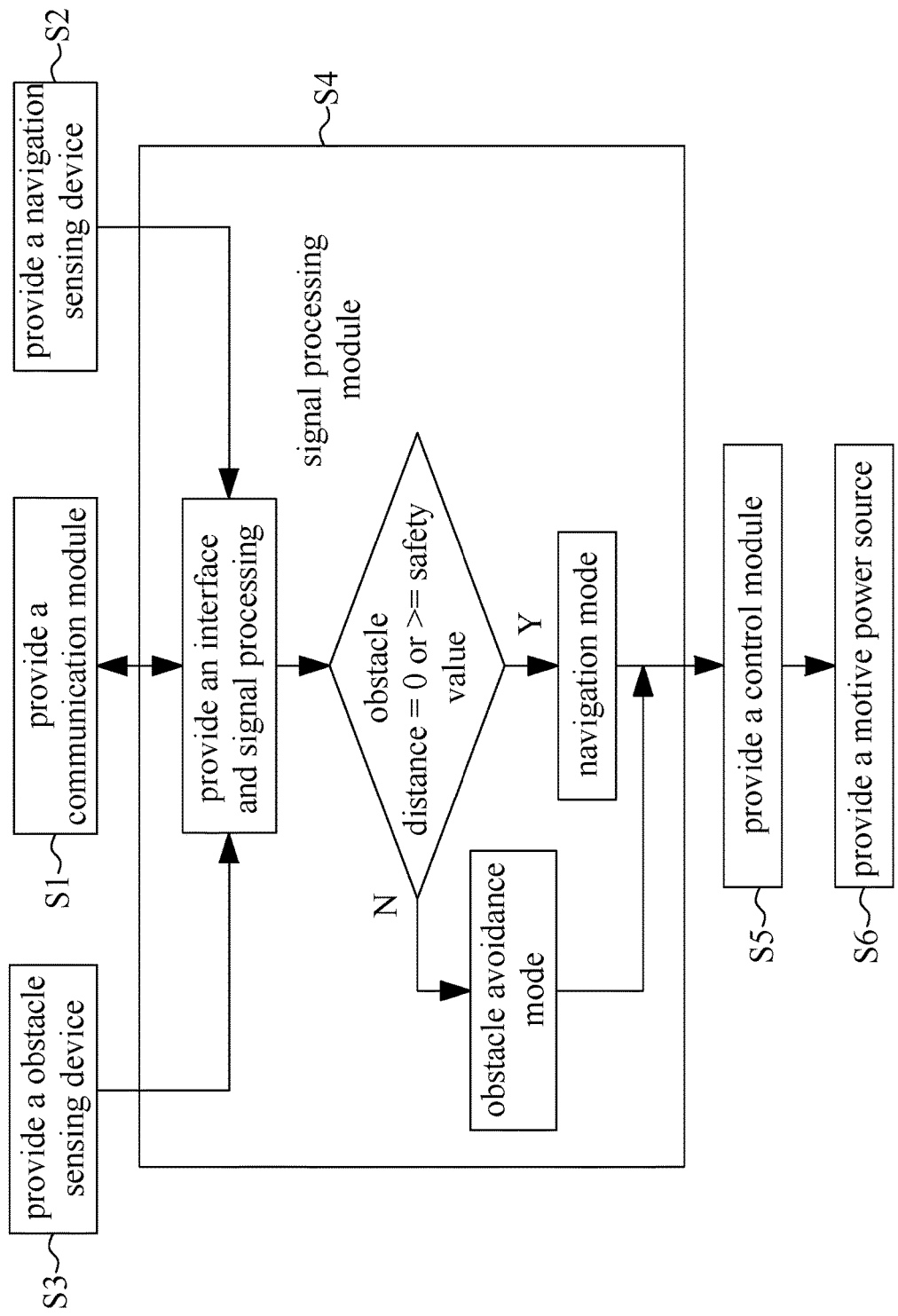
FIG. 3 shows a flowchart of a UAV navigation obstacle avoidance method according to an embodiment of the present disclosure.

Please refer to FIG. 3, which is a flowchart of a UAV navigation obstacle avoidance method according to an embodiment of the present disclosure. The UAV navigation obstacle avoidance method is used for actively controlling the UAV motive power source, controlling the flight direction of the UAV and avoiding the obstacle. The method includes follow steps:

Step 1 (S1) provides a communication module for transmitting the UAV's present position, safety setting and flight mission planning route to the signal processing module before the UAV taking off, and continuously communicating with the ground-base control station after the UAV taking off.

Step 2 (S2) provides a navigation sensing device for providing information such as flight heading, attitude, speed and real-time position of the UAV to the signal processing module in real time.

Step S3 (S3) provides an obstacle sensing device for providing information of the relative direction, the velocity and the distance between the UAV and the dynamic or static obstacle. The relative distance is set to 0 if no obstacle detected.

Step S4 (S4) provides a signal processing module for periodically receiving sensing values of the navigation sensing device and the obstacle sensing device, receiving information from the ground-base control station through the communication module, and generating a flight control signal being processed by the signal processing module to the control module. The signal processing module executes the navigation mode if the distance between the UAV and the obstacle detected by the obstacle sensing device is greater than or equal to the safety setting value or equal to 0. The signal processing module executes the obstacle avoidance mode if the relative distance between the UAV and the obstacle is less than the safety setting value and greater than 0. In the navigation mode, the signal processing module sent the flight control signal to the control module after processing the navigation correction according to the sensing signal of the navigation sensing device and the flight mission planning route. In the obstacle avoidance mode, the signal processing module sent the flight control signal to the control module after processing the obstacle navigating correction according to the sensing signal of the obstacle avoidance sensing device, the sensing signal of the navigation sensing device and the flight mission planning route. The signal processing module also sends the UAV information to the ground-base control station periodically through the communication module.

Step 5 (S5) provides a control module, which receives the flight control signal provided by the signal processing module.

In step S6 (S6), the UAV motive power source performs UAV flight heading, attitude and speed control and various UAV flight control operations according to control signals of the control module.

According to an embodiment of the present disclosure, the method conduct the navigation flight of the UAV according to the sensing signals of the navigation device and the planned route of the flight mission when there is no obstacle security threat. The method conducts the obstacle avoidance flight according to the sensing signals of the obstacle avoidance device, the sensing signals of the navigation module and the planned route of the flight mission when there is an obstacle security threat. The method can make the UAV go forward to the original planning follow-up flight route after the obstacle security threat disappearing.

What is claimed is:

1. An unmanned aerial vehicle (UAV) navigation obstacle avoidance system, equipped with functions of automatically controlling UAV's motive power sources, for UAV flight heading, attitude and speed control and obstacle avoidance, the system comprising:
   a communication module, which is a transmitting/receiving bidirectional device, for serving as a function of transmitting and receiving information between the UAV and the ground-base control station;
   a sensing device, disposed around the UAV, for providing the relative direction, the velocity and the distance between the UAV and dynamic or static obstacles to a signal processing module;
   the signal processing module, which generates a UAV flight control signal according to a flight mission planning route received and sensing signals of the sensing device; and
   a control module, which receives the flight control signal generated by the signal processing module and controls each motive power sources of the UAV for the purpose of UAV flight control and obstacle avoidance.

2. The UAV navigation obstacle avoidance system of claim 1, wherein the sensing device includes a navigation sensing device and an obstacle sensing device.

3. The UAV navigation obstacle avoidance system of claim 2, wherein the navigation sensing device includes a Global Positioning System (GPS)/Global Navigation Satellite System (GNSS) and an inertial measurement unit (IMU).

4. The UAV navigation obstacle avoidance system of claim 2, wherein the obstacle sensing device includes a camera and radar.

5. The UAV navigation obstacle avoidance system of claim 1, wherein the signal processing module is a microprocessor.

6. An unmanned aerial vehicle (UAV) navigation obstacle avoidance method, equipped with functions of automatically controlling UAV's motive power sources, for UAV flight heading, attitude and speed control and obstacle avoidance, the method comprising following steps:
   providing a communication module, which is a transmitting/receiving bidirectional device and serves as a function of transmitting and receiving information between the UAV and the ground-base control station;
   providing a sensing device, which generates sensing signals including the relative direction, the velocity and the relative distance between the UAV and dynamic or static obstacles, and also including the flight heading, attitude, acceleration and real-time position of the UAV;
   providing a signal processing module, which receive sensing signals from the sensing device and a flight mission planning route from the communication module and the sensing device and generates a UAV flight control signal; and
   providing a control module, which receives the flight control signal and controls each motive power sources of the UAV for the purpose of UAV flight control and obstacle avoidance.

7. The UAV navigation obstacle avoidance method of claim 6, wherein the sensing device includes a navigation sensing device and an obstacle sensing device.

8. The UAV navigation obstacle avoidance method of claim 7, wherein the navigation sensing device includes a Global Positioning System (GPS)/Global Navigation Satellite System (GNSS) and an inertial measurement unit (IMU).

9. The UAV navigation obstacle avoidance method of claim 7, wherein the obstacle sensing device includes a camera and radar.

10. The UAV navigation obstacle avoidance method of claim 6, wherein the communication module transmits the UAV's present position, safety value setting and flight mission planning route to the signal processing module before the UAV taking off and continuously communicates with the ground-base control station after the UAV taking off.

* * * * *